United States Patent
Vanden Berg et al.

(10) Patent No.: US 10,035,509 B2
(45) Date of Patent: Jul. 31, 2018

(54) EARLY WARNING INTERSECTION DEVICE

(71) Applicant: Safer Technology Solutions LLC, Holland, MI (US)

(72) Inventors: Thomas Francis Vanden Berg, Holland, MI (US); Karen Lynn Vanden Berg, Holland, MI (US); Douglas Brian Vanden Berg, Holland, MI (US); Scott Thomas Vanden Berg, Holland, MI (US)

(73) Assignee: Safer Technology Solutions LLC, Holland, MI (US)

( * ) Notice: Subject to any disclaimer, the term of this patent is extended or adjusted under 35 U.S.C. 154(b) by 0 days.

(21) Appl. No.: 15/229,281

(22) Filed: Aug. 5, 2016

(65) Prior Publication Data
US 2017/0039850 A1     Feb. 9, 2017

Related U.S. Application Data

(60) Provisional application No. 62/201,826, filed on Aug. 6, 2015, provisional application No. 62/262,984, filed
(Continued)

(51) Int. Cl.
*B60W 30/18* (2012.01)
*B60Q 9/00* (2006.01)
*B60W 10/04* (2006.01)
*B60W 10/18* (2012.01)
*G08G 1/09* (2006.01)
(Continued)

(52) U.S. Cl.
CPC ............... *B60W 30/18* (2013.01); *B60Q 9/00* (2013.01); *B60W 10/04* (2013.01); *B60W 10/18* (2013.01); *G05D 1/0276* (2013.01);
*G08G 1/09623* (2013.01); *G08G 1/096716* (2013.01); *G08G 1/096725* (2013.01); *G08G 1/096758* (2013.01); *G08G 1/096783* (2013.01); *B60W 2550/20* (2013.01); *B60W 2550/22* (2013.01); *B60W 2550/30* (2013.01); *B60W 2710/18* (2013.01);
(Continued)

(58) Field of Classification Search
CPC .... G08G 1/0962; B60W 10/04; B60W 10/18; B60W 2550/22; B60W 2550/30; B60W 2710/18; B60W 2720/10; B60W 2710/30; B60Q 9/00
See application file for complete search history.

(56) References Cited

U.S. PATENT DOCUMENTS 6,720,920 B2    4/2004    Breed et al.
6,882,287 B2    4/2005    Schofield
(Continued)

OTHER PUBLICATIONS

Jianquang Wang et al., "RFID-Based Vehicle Positioning and Its Applications in Connected Vehicles", Sensors 2014, 14 pp. 4225-4238.
(Continued)

*Primary Examiner* — Thomas Ingram
(74) *Attorney, Agent, or Firm* — Varnum, Riddering, Schmidt & Howlett LLP

(57) ABSTRACT

A method and system for warning an occupant of a vehicle of a traffic condition includes sensing an impending traffic condition, providing a first indication of the impending traffic condition, and monitoring the operating conditions of the vehicle after the first indication for changes in the operating conditions of the vehicle.

23 Claims, 18 Drawing Sheets

Related U.S. Application Data on Dec. 4, 2015, provisional application No. 62/301,381, filed on Feb. 29, 2016.

(51) Int. Cl.
*G05D 1/02* (2006.01)
*G08G 1/0962* (2006.01)
*G08G 1/0967* (2006.01)

(52) U.S. Cl.
CPC ..... *B60W 2710/30* (2013.01); *B60W 2720/10* (2013.01); *G05D 2201/0213* (2013.01)

(56) References Cited

U.S. PATENT DOCUMENTS

| | | | |
|---|---|---|---|
| 7,023,379 B2 | 4/2006 | Turnbull | |
| 7,904,219 B1 | 3/2011 | Lowrey et al. | |
| 7,990,286 B2 | 8/2011 | Shankwitz et al. | |
| 8,188,887 B2 | 5/2012 | Catten et al. | |
| 8,350,723 B2 | 1/2013 | Serex | |
| 8,773,281 B2* | 7/2014 | Ghazarian | G01S 19/17 340/903 |
| 8,868,220 B2 | 10/2014 | Crucs | |
| 2005/0046597 A1* | 3/2005 | Hutchison | G08G 1/07 340/917 |
| 2005/0083211 A1* | 4/2005 | Shafir | G01C 21/3697 340/905 |
| 2006/0116821 A1* | 6/2006 | Kim | G08G 1/164 701/301 |
| 2008/0133136 A1* | 6/2008 | Breed | B60N 2/2863 701/301 |
| 2011/0169625 A1* | 7/2011 | James | B60Q 9/008 340/439 |
| 2012/0007764 A1* | 1/2012 | Kawasaki | B60R 19/483 342/70 |
| 2013/0049989 A1* | 2/2013 | Howarter | G08G 1/096783 340/905 |
| 2013/0271292 A1 | 10/2013 | McDermott | |
| 2016/0318490 A1* | 11/2016 | Ben Shalom | B60T 7/12 |

OTHER PUBLICATIONS

Harshada Rajale et al.,"Design of a road sign informing system based on GPS and RFID", IEEE Explore Digital Library, Jul. 10-11, 2014 Conference, Abstract accessed Dec. 8, 2016.

* cited by examiner

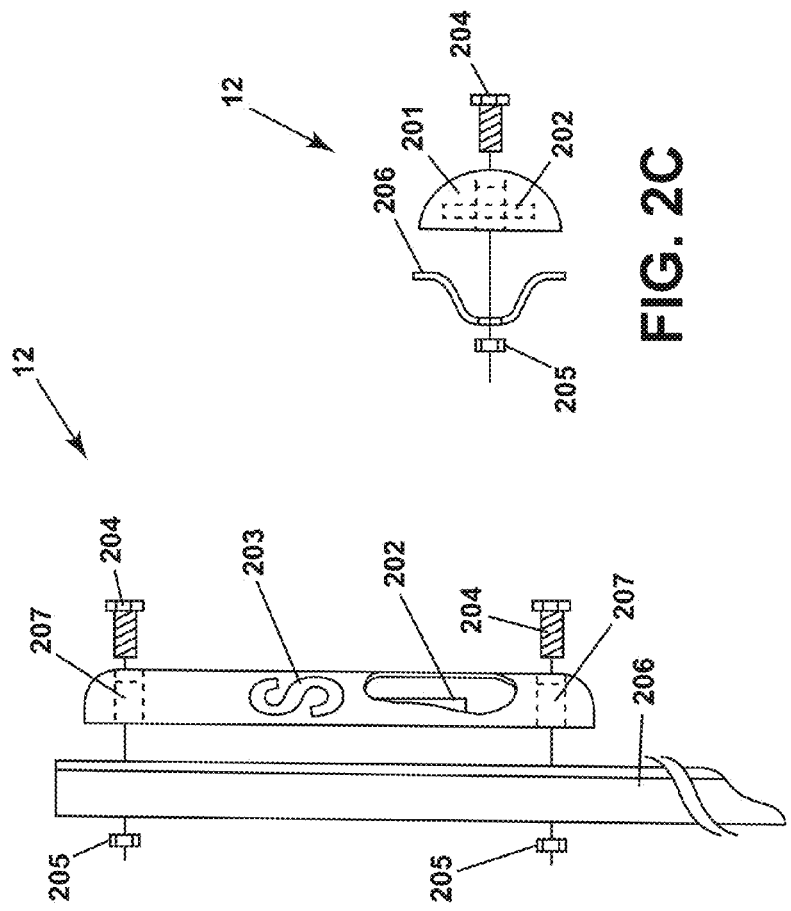
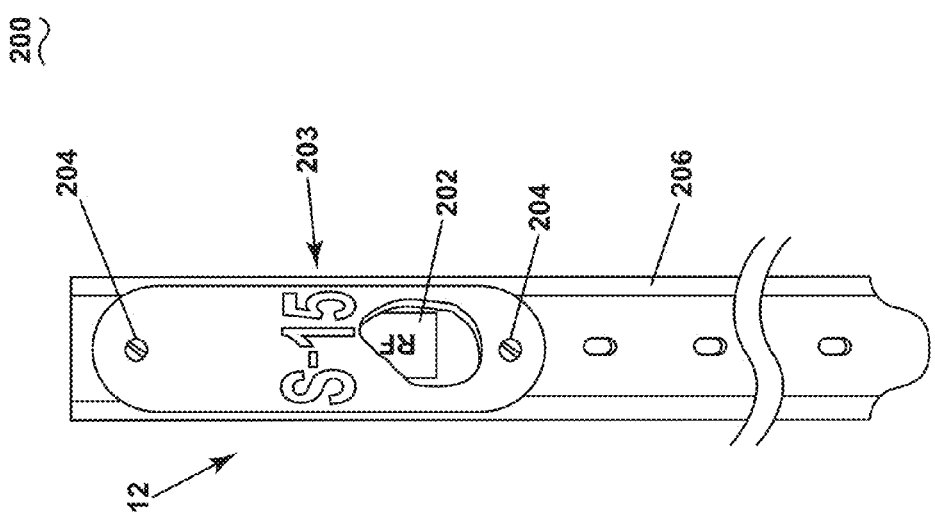

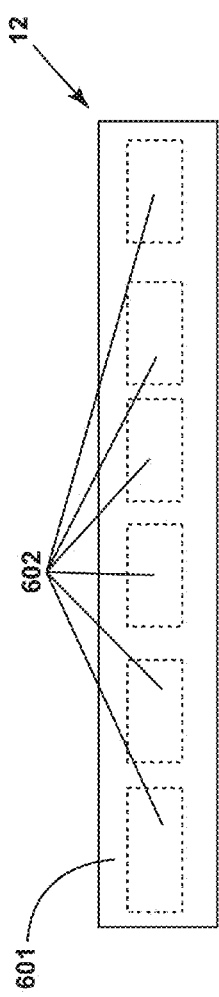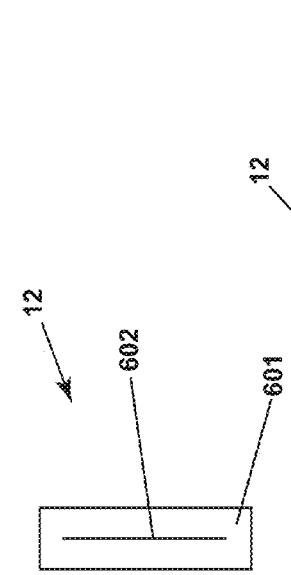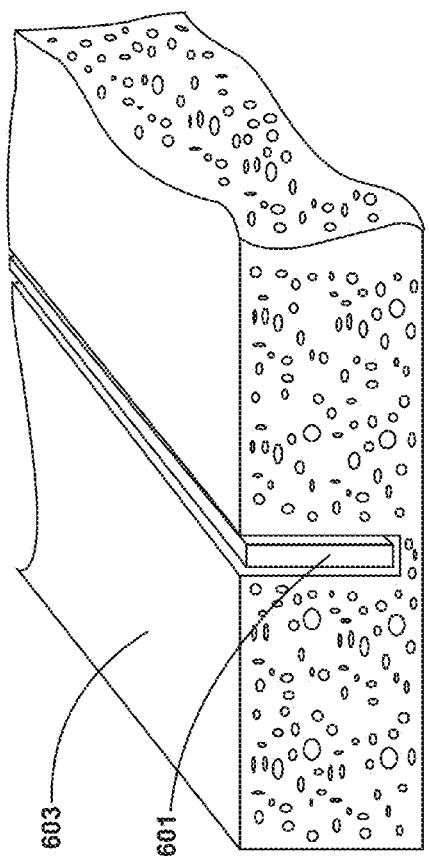
FIG. 6A
FIG. 6B
FIG. 6C

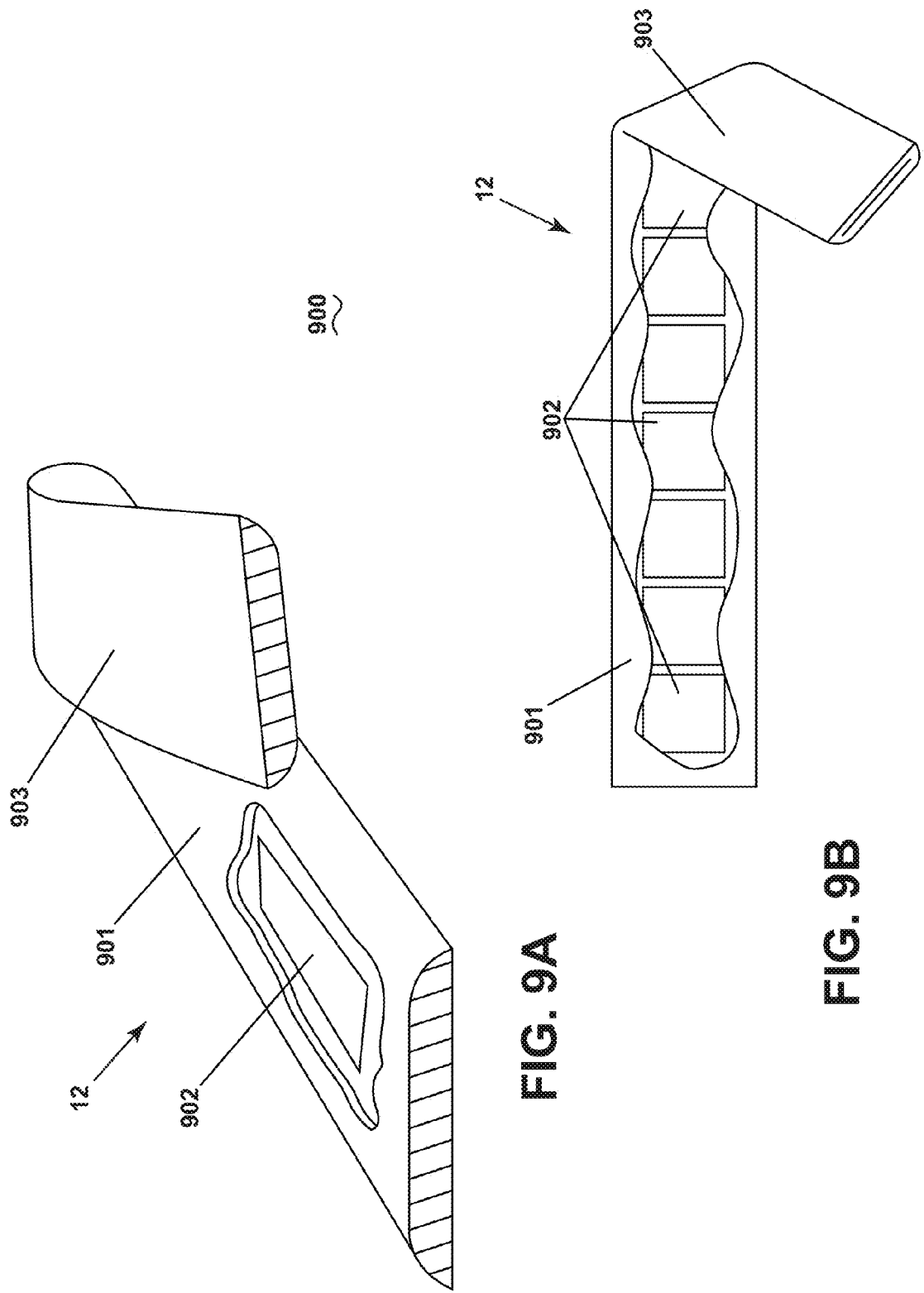

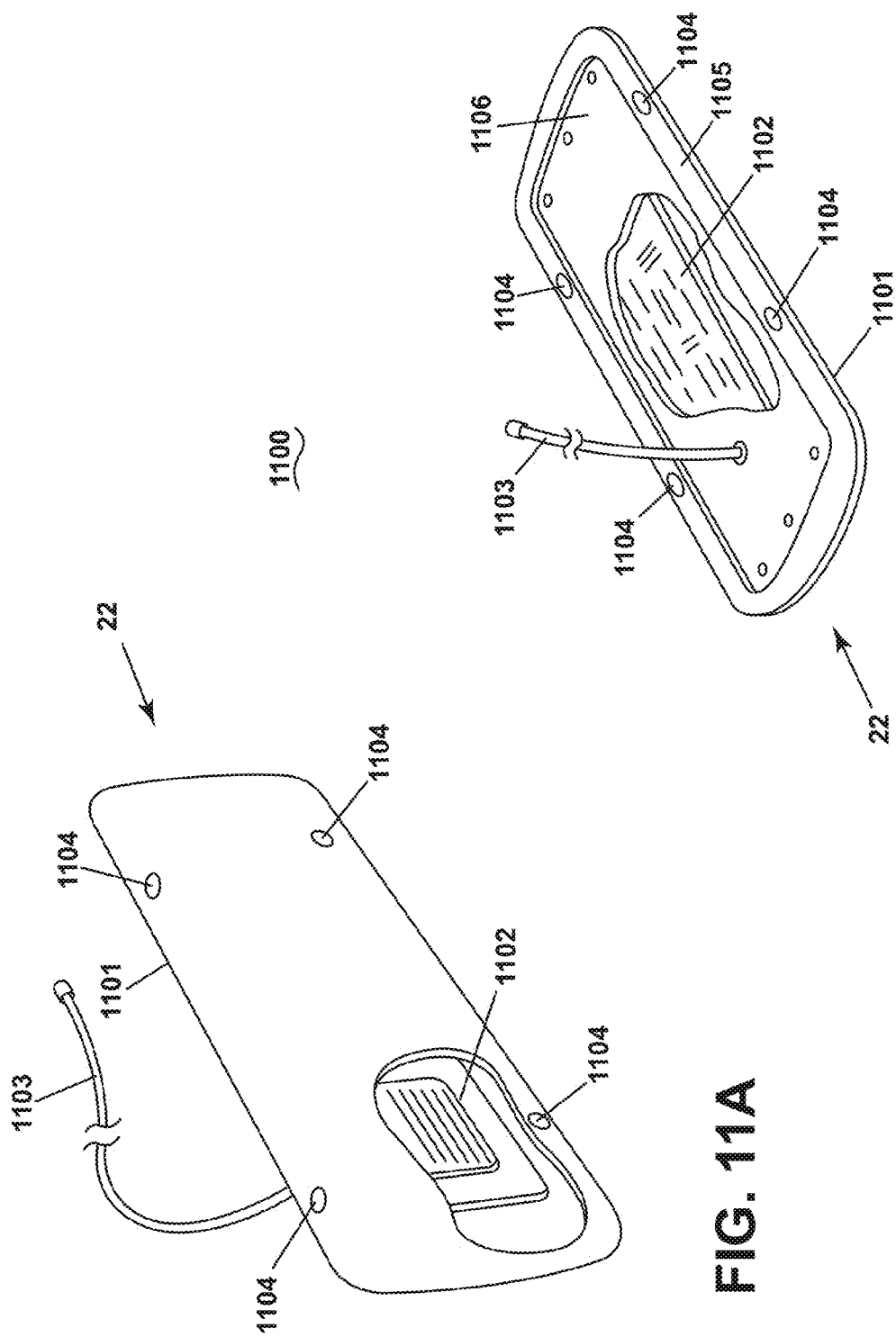

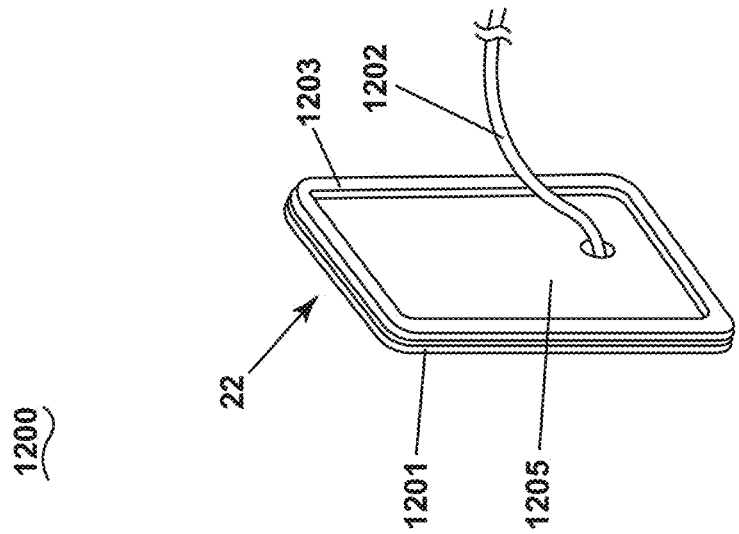
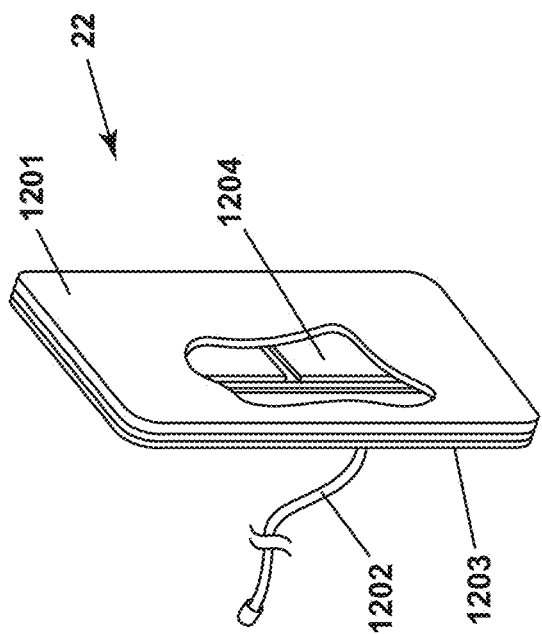
FIG. 12A
FIG. 12B

EARLY WARNING INTERSECTION DEVICE

CROSS-REFERENCE TO RELATED APPLICATION(S)

This application claims the benefit of U.S. Provisional Patent Application No. 62/201,826, filed Aug. 6, 2015, U.S. Provisional Patent Application No. 62/262,984, filed Dec. 4, 2015, and U.S. Provisional Patent Application No. 62/301,381, filed Feb. 29, 2016, all of which are incorporated herein by reference in their entirety.

BACKGROUND

There are many times that a driver or other occupant of a motor vehicle is not aware that he or she is approaching an intersection which contains a signal generator such as, a traffic signal or stop sign in their direction of travel. For instance, distractions by others in the car, activity outside the vehicle, entertainment devices, or communication device activity such as cell phones and Email can reduce awareness of the driver of the situational awareness of the vehicle. In another instance, the driver or other occupant can simply not be paying attention to their environment or surroundings. In another instance, a driver may not be aware of a stop sign, or other signal generator can be caused by a lack of visibility because of weather, such as blowing snow, rain, heavy fog, the glare of the sun or the headlights of oncoming traffic, over-growth of trees and shrubbery, vehicles standing along the roadside, or missing signage due to accidents or vandalism. These non-limiting examples of factors reducing awareness result in the driver not stopping in time (i.e. prior to the stop sign or other signal generator), if at all, and potentially being involved in a vehicle collision.

BRIEF SUMMARY

In one aspect, a method of warning an occupant of a vehicle of a traffic condition comprising the steps of sensing an impending traffic condition, providing a first indication of the impeding traffic condition, monitoring the operating conditions of the vehicle after the first indication for changes in the operating conditions, determining whether any monitored changes in the operating conditions of the vehicle satisfy a predetermined traffic condition threshold for traversal of the impending traffic condition, and providing an enhanced modification of the operating conditions of the vehicle to the extent that any monitored changes in the operating conditions of the vehicle do not satisfy the predetermined traffic condition threshold within one of a predetermined period of reaction time, a predetermined distance of travel, or predetermined proximity of the impending traffic condition.

In another aspect, an apparatus for a vehicle, comprising a set of signal generators provided in an environmental installation external to the vehicle and configured to generate a first set of outputs related to an impending traffic condition, a first set of sensors provided on the vehicle and configured to generate a second set of outputs related to the operating conditions of the vehicle, an alert mechanism configured to provide a first alert and a second alert, wherein the second alert is greater than the first alert, a controller module configured to receive the first set of outputs and the second set of outputs, and configured to provide the first alert by way of the alert mechanism when the first set of outputs is received, and further configured to provide the second alert by way of the alert mechanism when the second set of outputs do not satisfy a predetermined traffic condition threshold within one of a predetermined period of reaction time, a predetermined distance of travel, or predetermined proximity of the impending traffic condition.

BRIEF DESCRIPTION OF THE DRAWINGS

In the drawings:

FIG. 2A is a front perspective view of a signal generator in accordance with various aspects described herein.

FIG. 2B is a side perspective view of the signal generator of FIG. 2A, in accordance with various aspects described herein.

FIG. 2C is a side perspective view of the signal generator of FIG. 2A, in accordance with various aspects described herein.

FIG. 6A is a schematic view of a signal generator in accordance with various aspects described herein.

FIG. 6B is a schematic view of the signal generator of FIG. 6A, in accordance with various aspects described herein.

FIG. 6C is a side view of the signal generator of FIG. 6A, in accordance with various aspects described herein.

FIG. 9A is an end perspective view of a signal generator in accordance with various aspects described herein.

FIG. 9B is a schematic view of the signal generator of FIG. 9A, in accordance with various aspects described herein.

FIG. 11A is a front perspective view of a detector in accordance with various aspects described herein.

FIG. 11B is a bottom perspective view of the detector of FIG. 11A, in accordance with various aspects described herein.

FIG. 12A is a front perspective view of a detector in accordance with various aspects described herein.

FIG. 12B is a side perspective view of the detector of FIG. 12A, in accordance with various aspects described herein.

DETAILED DESCRIPTION

Figure 1:
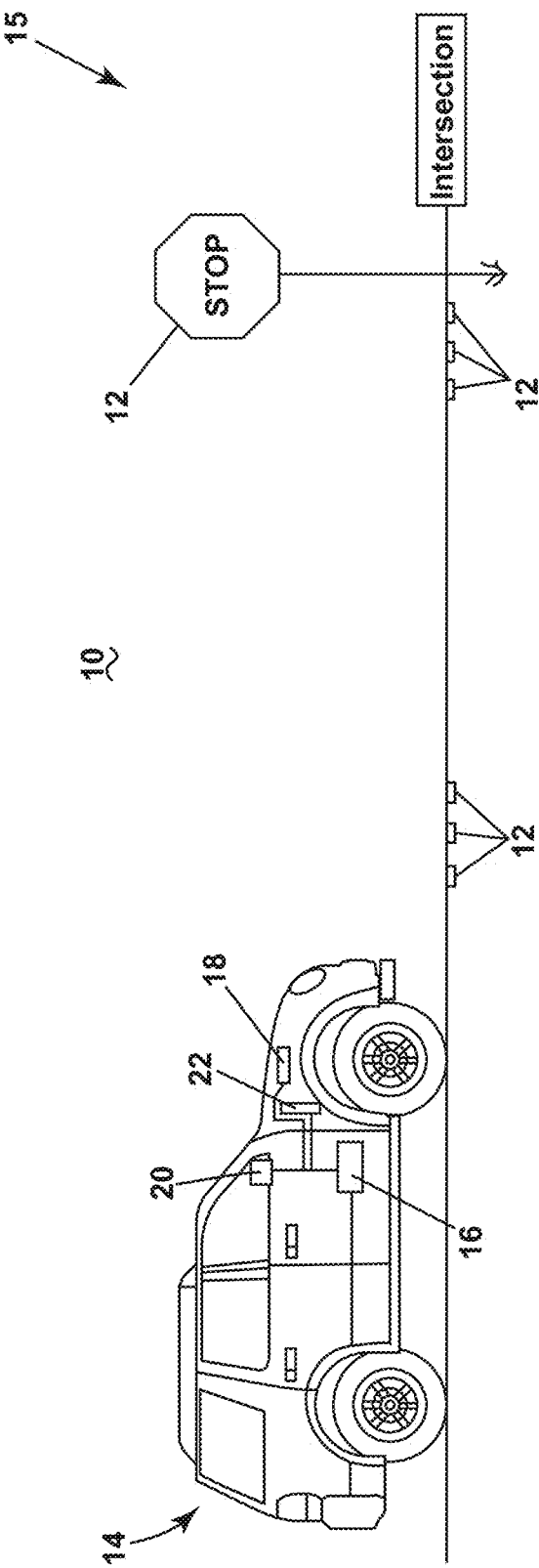
FIG. 1 is a schematic view of a warning system in accordance with various aspects described herein.

Aspects of the disclosure are applicable to all types of moving vehicles automobile safety, warning drivers, or occupants, and the like. While aspects of the disclosure are related to automobiles, embodiments of the description can be applied to any land, air, or water-based vehicles. Referring now to the drawings and FIG. 1 in particular, a warning system 10 is shown, such as an early warning device (EWD). The warning system 10 comprises a set of signal generators 12 and a vehicle 14 having a controller module 16, a first set of sensors, such as a set of vehicle sensors 18, and an alert mechanism 20. The warning system 10 can also comprise a second set of sensors, such as a set of detectors 22. As shown, the set of vehicle sensors 18, the alert mechanism 20, and the set of detectors 22 can be communicatively coupled with the controller module 16. While "a set of" various elements have been described, it will be understood that "a set" can include any number of the respective elements, including only one element.

The signal generator 12 is configured to generate a first set of outputs related to an impending traffic condition 15 such as regulatory signs (i.e. a stop sign, yield sign, speed limit sign, traffic light), warning signs (i.e. intersection, turn or curve, work zone), road lines, or a change in traffic conditions (i.e. entering a work zone, speed zone, or school zone), or the like. The signal generator 12 can be located external to the vehicle 14 (i.e. in or around a roadway) and can include a set of signal-generating devices, such as radio frequency identification (RFID) tags, positioned at, near, or within an environmental installation. In one non-limiting example, the set of signal generators 12 can be positioned between a known direction of travel of the vehicle 14 upstream of the impending traffic condition 15, such as proximate to a road way or travel path, ahead of the condition 15. In one non-limiting example, the signal generator 12 can include the generator 12 or generating device being embedded into the vehicle pathway or mounted onto a sign or traffic light. The first set of outputs can be indicative of a type of impending traffic condition, a location of the traffic condition, a distance relative to the traffic condition, or values or thresholds related thereof.

The set of detectors 22 can be configured to receive the first set of outputs from the set of signal generators 12, and provide a third set of outputs to the controller module 16. In one non-limiting example, the set of detectors 22 can include a radio frequency identification (RFID) antenna mounted, coupled, supported, or affixed to the vehicle 14. The arrangement of the set of detectors 22 can be selected to provide for adequate, reliable, or expected communications between the detectors 22 and the set of signal generators 12. For example, the set of detectors 22 can be mounted on the exterior of the vehicle 14 (e.g. under the vehicle, on the side of the vehicle, etc.) based on a corresponding passing or location of the set of signal generators 12 (e.g., respectively, in the vehicle roadway, on passing poles, etc.).

The set of detectors 22 can be configured to receive the first set of outputs from the set of signal generators 12 by way of any suitable communication link or communication form, such that that information can be transmitted or communicated from the signal generators 12 to the detectors 22. It is contemplated that the communication link can be a wireless communication link and can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, optical data link suitable for emission-controlled operations, RFID, or a combinations thereof. While RFID is primarily described herein, embodiments of the disclosure are not limited to only RFID communication links. It will also be understood later-developed wireless networks are certainly contemplated as within the scope of aspects of the disclosure.

In one example configuration, the set of detectors 22 can detect the impending traffic condition 15 from the set of signal generator 12 relative to or related to the impending traffic condition 15. The set of signal generators 12 generates a first set of sensor outputs, which is received by at least one of the set of detectors 22. The first set of sensor outputs from the signal generator 12 can be provided to a controller module 16 by the set of detectors 22. Alternatively, the set of signal generators 12 can provide the first set of sensor outputs directly to be received by the controller module 16 by way of a communication link, as described herein.

The controller module 16 can be configured to detect, receive, translate, or the like, the signals from multiple specifically programmed environmental installations or set of signal generators 12, for example, via the set of detectors 22. The controller module 16 can further be configured to provide a set of indicators or indications to an occupant of the vehicle, based on the sensed impending traffic condition 15, which can include, for instance, alerting the driver of a vehicle that they are approaching a signal generator 12, an impending traffic condition 15, or as a stop sign.

The controller module 16 can also receive a second set of outputs generated by a second set of sensors 18 configured to sense the operating conditions of the vehicle such as vehicle speed, acceleration, deceleration, gravitational forces experienced by the vehicle (positive and negative G-forces), a global positioning satellite location of the vehicle (GPS location), a vehicle braking status, a vehicle pathway or road condition, radar sensors, camera images/information, a temperature sensor, the current time of day, and specific driver preference settings, etc. The second set of sensors 18 can include sensors configured to sense, monitor, receive, or generate the second set of outputs based upon on-vehicle systems or off-vehicle systems (e.g. weather alerts, GPS). Non-limiting examples of the second set of sensors 18 can further include, or the second set of outputs can be generated from, a cellular mobile transceiver, a Body Control Module (BCM) having G-force sensors, a GPS data module, a vehicle speed sensor, a vehicle break sensor, camera data, a crash avoidance system, a driver preference setting, a clock, weather data, road condition sensors, vehicle brake lights, vehicle adaptive cruise control, automatic emergency braking systems, vehicle autonomous steering systems, vehicle audio/video interfaces, alert information centers, vehicle autonomous speed controls, and the like. Aspects of the disclosure can be included wherein, in addition to providing the generated signals to the controller module 16, the second set of sensors 18 can further receive controlling instruction from the controller module 16. Stated another way, the controller module 16 can receive information from the second set of sensors 18 as well as operably control a subset of system operations thereof (e.g. automatic braking systems, etc.).

In operation, the warning system 10 monitors the state of the vehicle 14 after the first indication of a signal generator 12. The alert mechanism 20 can be configured to operably provide a first indication of the impending traffic condition 15, such as an initial low keyed alert, or a first alert. In this sense, the alert mechanism 20 can be configured to provide at least one indication, including but not limited to, an audible indication, a visual indication, or tactile indication (e.g. vibratory alert, rumble of the controls, or of a seat for the occupant), or the like. The first indication of the impending traffic condition 15 can include, or be representative of appropriate action to be taken by the vehicle 14 based on the impending traffic condition 15. For example, if a stop sign or intersection is indicated by the set of signal generators 22, the first indication can include a distance to the stop sign or intersection, or an audible signal representative of the distance. Additional indications can be included, as described herein. In one example, the first indication can be arranged, selected, or configured to prompt the driver to take action related to or relative to the impending traffic condition 15.

The warning system 10 can further operate such that the controller module 16 monitors the operating conditions of the vehicle 14, for example, by way of the second set of sensors 18, for changes in the operating conditions of the vehicle 14 indicating that the vehicle or driver is responding to the first alert. The changes in the operating conditions of the vehicle 14 can be compared with a predetermined traffic condition threshold for safe traversal of the impending traffic condition 15. The predetermined traffic condition threshold can be received from the set of signal generators 12, looked up from a database, or the like, and can be tailored or unique to each impending traffic condition 15. In one example, the predetermined traffic condition threshold for a stop sign can include slowing the vehicle by 10 miles per hour at least 30 meters from the stop sign. In another example, the predetermined traffic condition threshold can include slowing the vehicle to under 10 miles per hour within 10 meters of the stop sign. The predetermined traffic condition threshold can further include a set of thresholds to provide a step-based set of rules for safe traversal of the impending traffic condition 15. Furthermore, a predetermined traffic condition threshold for a 35 mile per hour roadway can include different thresholds than a predetermined traffic condition threshold for a 45 mile per hour roadway. In another non-limiting configuration, the predetermined traffic condition threshold can account for the configuration of the roadway (speed, curves, blind spots, etc.).

The warning system 10 or controller module 16 can determine, or can continuously determine, whether any monitored changes in the operating condition of the vehicle 14 satisfy the predetermined traffic condition thresholds for traversal of the impending traffic condition. In instances where the monitored changes indicate the thresholds are not satisfied, the controller module 16 can be configured to provide an enhanced modification. In one example, the enhanced modification can include a second indication, such as a louder audible indication, a more apparently, more visible, or a brighter visual indication, or more tactile indication, or the like, compared with the first indication. In addition to, or in place of the second indication, the enhanced modification can include modifying, changing, altering, or the like, of the operating conditions of the vehicle within one of a predetermined period of reaction time, a predetermined distance of travel, or a predetermined proximity of the impending traffic condition 15. In one example operation, the enhanced modification can include engaging an automatic braking system or autonomous control system to stop prior to the impending traffic condition 15, limit the operation of the vehicle 14 during the traffic condition 15 (e.g. limit maximum speed through a school zone or construction zone), or avoid the impending traffic condition 15 altogether. Again, the enhanced modification can be tailored to, or unique to a particular impending traffic condition 15.

Alternatively, if the warning system 10 or the controller module 16 determines the operating conditions of the vehicle 14 are sufficient or satisfy the predetermined traffic condition threshold for the impending traffic condition 15, no further action or indications are provided to the occupant of the vehicle 14. Thus the warning system 10 provides for a two stage warning and operation system. The warning system 10 or controller module 16 can also include a personal preference control configured such that the driver or an occupant of the vehicle 14 can adjust alerts, indicators, enhanced modifications, or the like, from the alert mechanism 20 or override the system in an emergency. Adjustment of the alerts can include volume adjustments, brightness adjustments, and adjustments of the sensitivity to the signal generators 12. Because driving habits vary with individuals, some alerts may be adjusted by the driver or the system can be turned off in an emergency situation using a driver preference and override control.

One non-limiting example of a signal generator 12 is shown in FIGS. 2A, 2B, and 2C. FIG. 2A illustrates the signal generator 12 in the form of a Roadside Mounted RFID tag Holder 200 (RMH) mounted, for example, to a road sign stake or pole 206. The RMH 200 includes a body 201, such as a one piece composite non-inductive structure. The RMH 200 or body 201 can include an encapsulated RFID tag 202 configured to generate or provide at least one output related to an impending traffic condition. For instance, the at least one output can be related to the impending traffic condition illustrated in further signage, or the pole 206 can be located proximate to the impeding traffic condition, as described herein. At least one of the RMH 200 or body 201 can include indicia or a designation number 203 indicating at least one of the RFID tag 202, its RFID code, the impending traffic condition, or the at least one generated output. At least one of the RMH 200 or the body 201 can include holes 207 configured such that the RMH can be bolted to the standard mounting pole 206 using, for example, bolts 204 and nuts 205, or any other suitable mechanical fastener or adhesive. The mounting pole 206 can include a standard mounting pole used for, but is not limited to, mounting regulatory signs, informational signs, warnings signs, and the like. Additionally, the mounting pole 206 can be utilized exclusively for mounting the RMH 200.

Figure 3A:
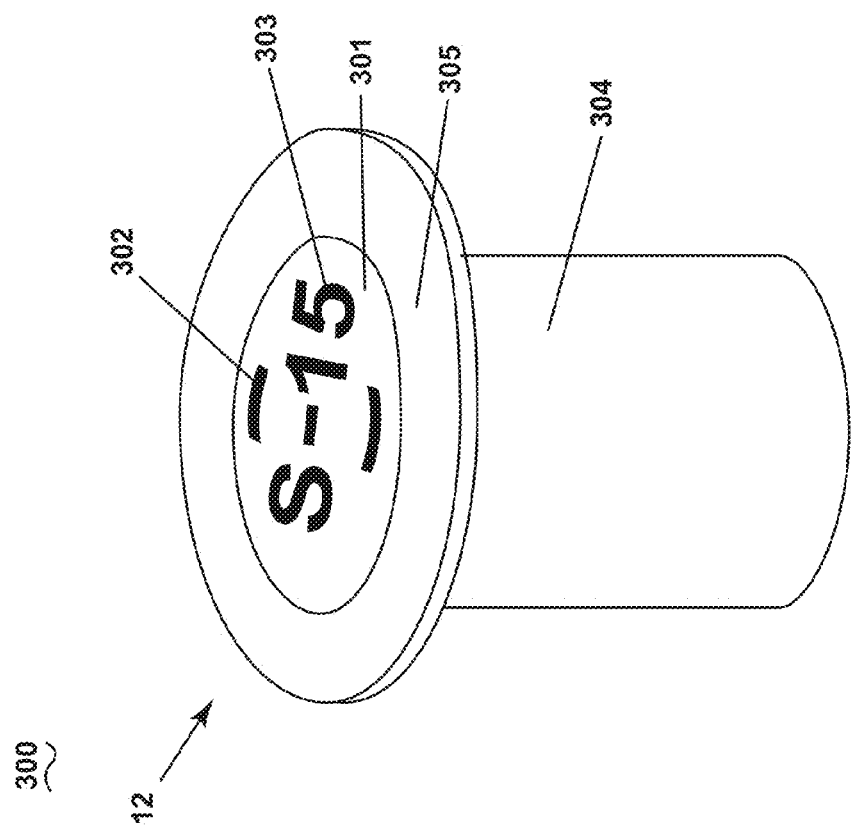
FIG. 3A is a side perspective view of a signal generator in accordance with various aspects described herein.
Figure 3B:
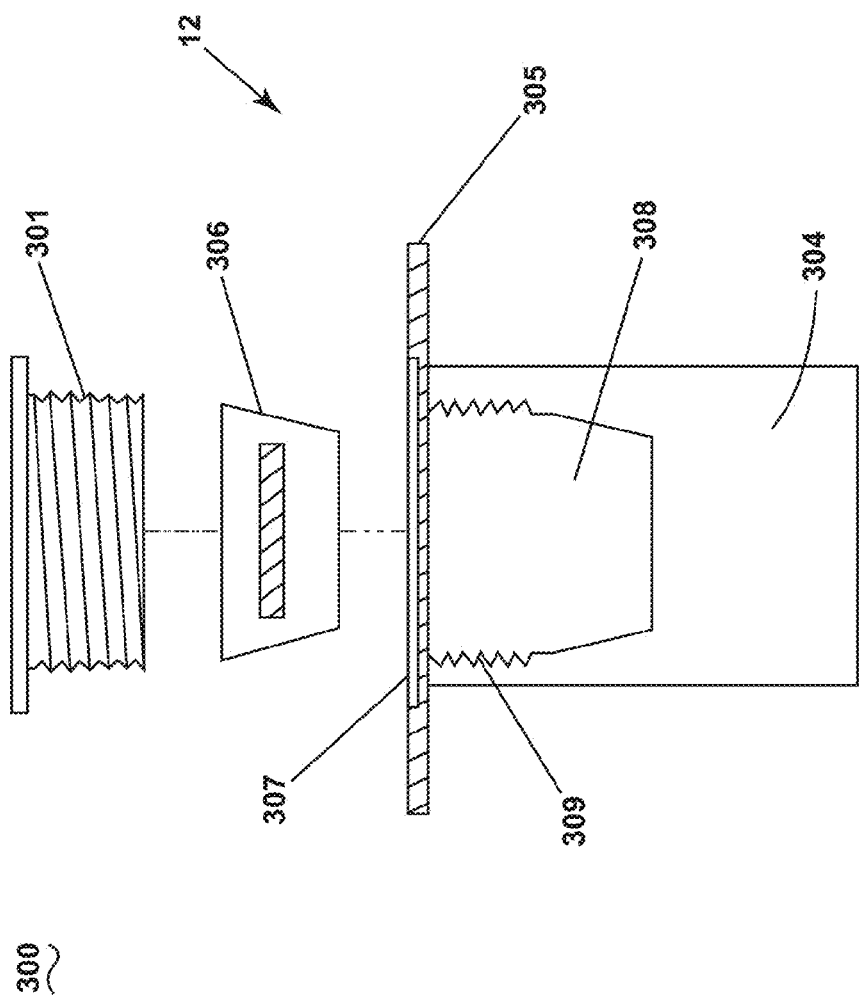
FIG. 3B is an exploded side view of the signal generator of FIG. 5A, in accordance with various aspects described herein.

Turning to FIGS. 3A and 3B, another non-limiting example signal generator 12 is illustrated in the form of a Paved Road Flush mounting RFID tag holder 300 (PRF). An outside container, base, or body 304 of the holder can be constructed of a corrosion resistant non-inductive composite material. The holder 300 can be approximately 4" long and include a flange 305 on a top end of the body 304 used to help install the top end of the holder 300 flush with a surface, such as the road surface. A removable threaded screw cap 301 can be included to in the holder 300, and can be configured to present a flush surface with the flange 305 when fully assembled or received by the holder 300. The cap 301 can also incorporate a set of key slots 302 configured to match a corresponding keyed removal tool to prevent unauthorized removal of the holder 300 or cap 301.

The interior construction of the holder 300 (FIG. 3B) illustrates a cavity 308 having approximately the same dimension as the encapsulated RFID tag 306, a threaded portion 309 which will accept the cap 301, and a recess 307 molded into the flange to accept the cap 301, such as to ensure a flush surface, as described above. The holder 300 can be placed in a precisely cut hole in the road surface along with a sealant, up to the positioning flange 305. The encapsulated RFID tag 306 can be placed in the holder 300 and secured within the holder 300 by way of the assembling of the cap 301 with the body 304. At least one of the holder 300 or body 304 can include a designation number 303 indicating the type of RFID tag 306, its RFID code, the impending traffic condition, or the at least one generated output. In the illustrated example, the designation number 303 can be provided on the cap 301, and visible from the road surface.

Figure 4:
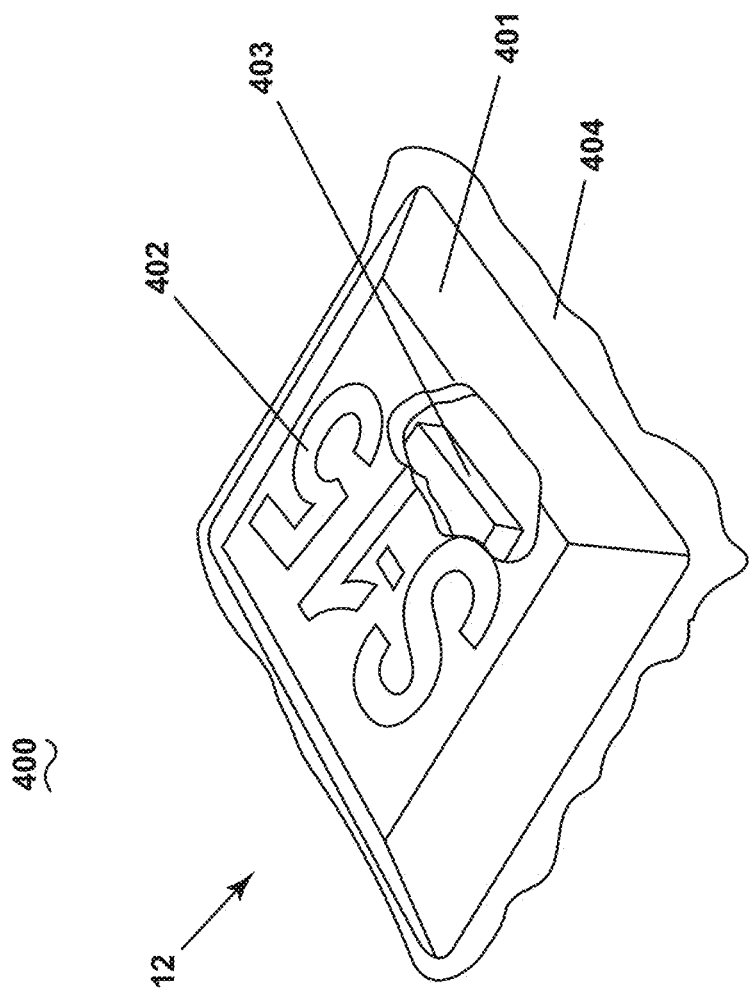
FIG. 4 is a top perspective view of a signal generator in accordance with various aspects described herein.

Yet another example of a non-limiting signal generator 12 is illustrated in FIG. 4, shown in the form of a Paved Road surface Mounted RFID tag holder 400 (PRS). The RFID holder 400 can include a single piece non-inductive composite unit encapsulating an RFID tag 403. The signal generator 400 can include a designation number 402 as previously described herein. The holder 400 can be secured to the surface of the road using, for example, a mechanical fastener, or an adhesive 404, such as a commercial glue.

Figures 5A, 5B:
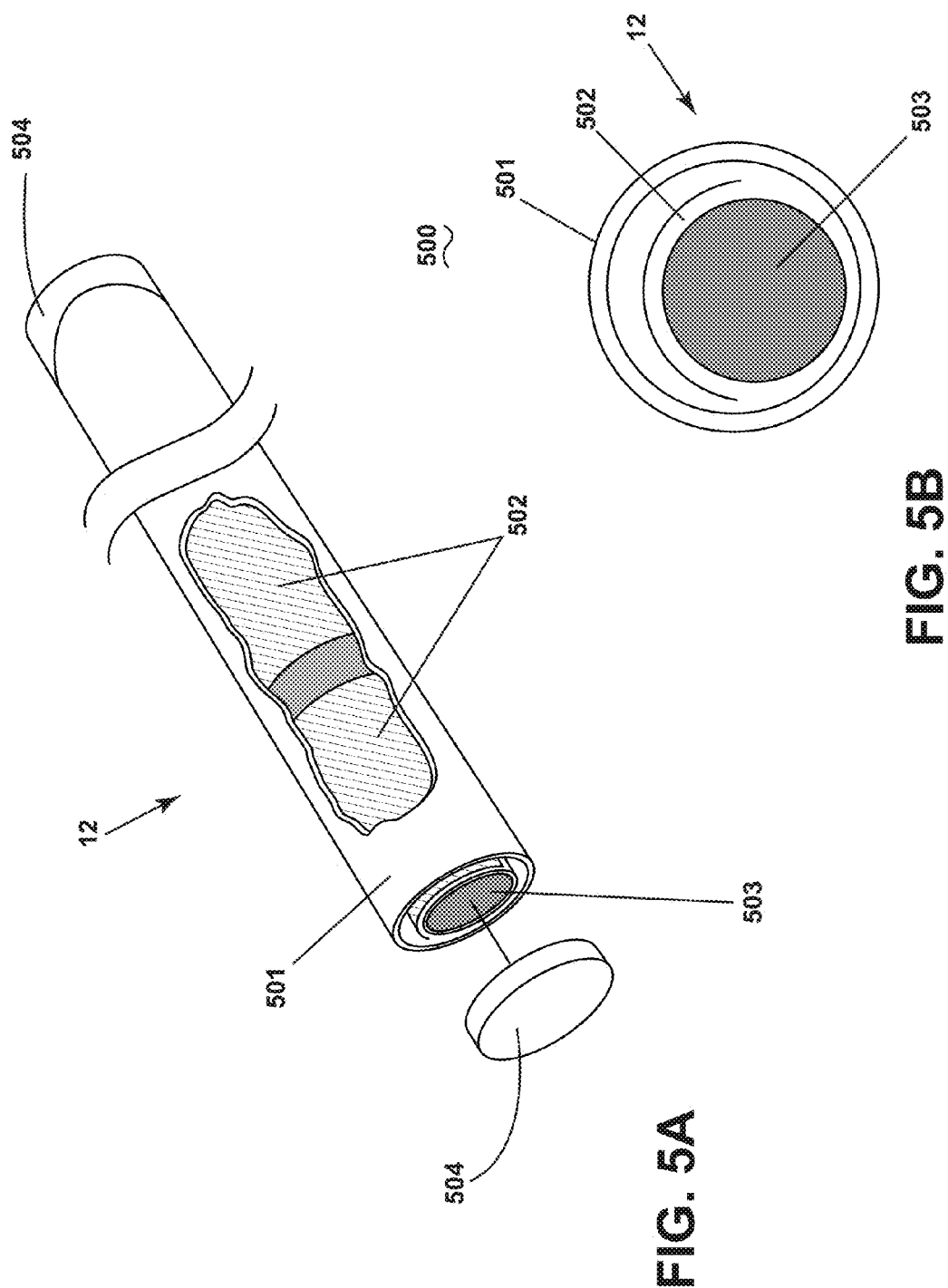
FIG. 5A is side perspective view of a signal generator in accordance with various aspects described herein.
FIG. 5B is a cross-sectional view of the signal generator of FIG. 5A, in accordance with various aspects described herein.

Another example of a non-limiting signal generator 12 is illustrated in FIGS. 5A and 5B and shown in the form of a Buriable Road RFID Tag Tube 500 (BRTT). FIG. 5A illustrates a perspective view of the BRTT 500, while FIG. 5B illustrates a cross-sectional view of the BRTT 500. The BRTT 500 can include an outer tube 501 and a non-inductive flexible core 503 received within the outer tube 501 to support the suspension of one or more RFID tags 502. The core 503 of the BRTT 500 can include a flexible non-inductive material construction running length of the outer tube 501. In the non-limiting illustrated example, the RFID tag 502 can be wrapped around, or external to the core 503. Alternatively the RFID tag 502 can be received within the core 503. I another non-limiting example, multiple tags 502 can be spaced along the length of the core 503, in an axial direction of the major axis of the core 504 or BRTT 500. The outer tube 501 can be sealed at both lateral ends with a cap 504, for instance, to make the tube water tight. The BRTT 500 can placed at or in the road surface during construction or resurfacing or is installed later by cutting a groove in the surface of the road and covering it over with a road sealant.

FIGS. 6A, 6B, and 6C illustrate another example of a non-limiting signal generator 12 shown in the form of a Buriable Vertical Road RFID Tag Strip 600 (BVRTS). The BVRTS 600 includes a main body 601 that is a non-conductive flexible composite material with multiple RFID tags 602 permanently embedded within the body 601, as shown schematically in FIG. 6A, and from a side view cross section of FIG. 6B. The BVRTS 600 can be designed to be inserted in or received by a groove cut into the surface of the roadway 603, as demonstrated in the non-limiting view of FIG. 6C. In one non-limiting example, the BVRTS 600 or the roadway 603 can be covered over with sealant to seal the BVRTS 600 relative to the roadway 603. In this sense, the BVRTS 600 can placed at or in the road surface during construction or resurfacing or is installed later by cutting a groove in the surface of the road and covering it over with a road sealant.

Figure 7A:
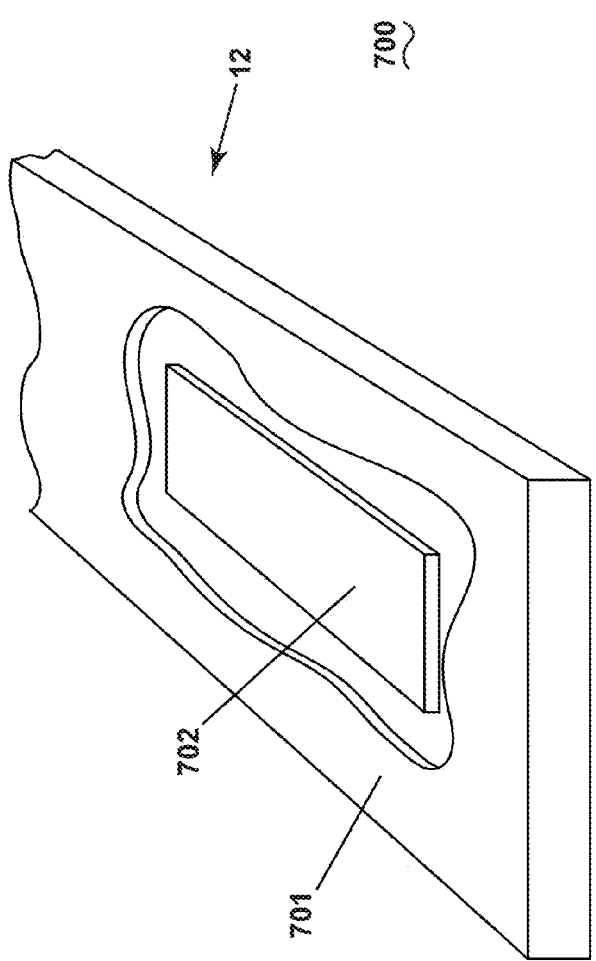
FIG. 7A is an end perspective view of a signal generator in accordance with various aspects described herein.
Figure 7B:
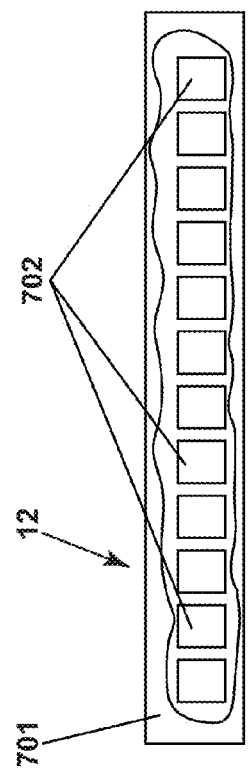
FIG. 7B is a schematic view of the signal generator of FIG. 7A in accordance with various aspects described herein.

Turning to FIGS. 7A and 7B, another example of a non-limiting signal generator 12 is shown in the form of Paved Road Flush mounting RFID Strip 700 (PRFS). The PRFS 700 can include a RFID holder or body 701. In one non-limiting example, the body 701 can include a molded rigid non-inductive composite material capable of withstanding high temperature. The body 701 can house or include a set of RFID tags 702, for example, encapsulated along the length of the body 701. As with other example signal generators 12, the PRFS 700 can be flush mounted into grooves cut into a road surface, embedded into a road surface during application of paving material or concrete, or laid in a cut made into the existing road surface and then paved over.

Figure 8A:
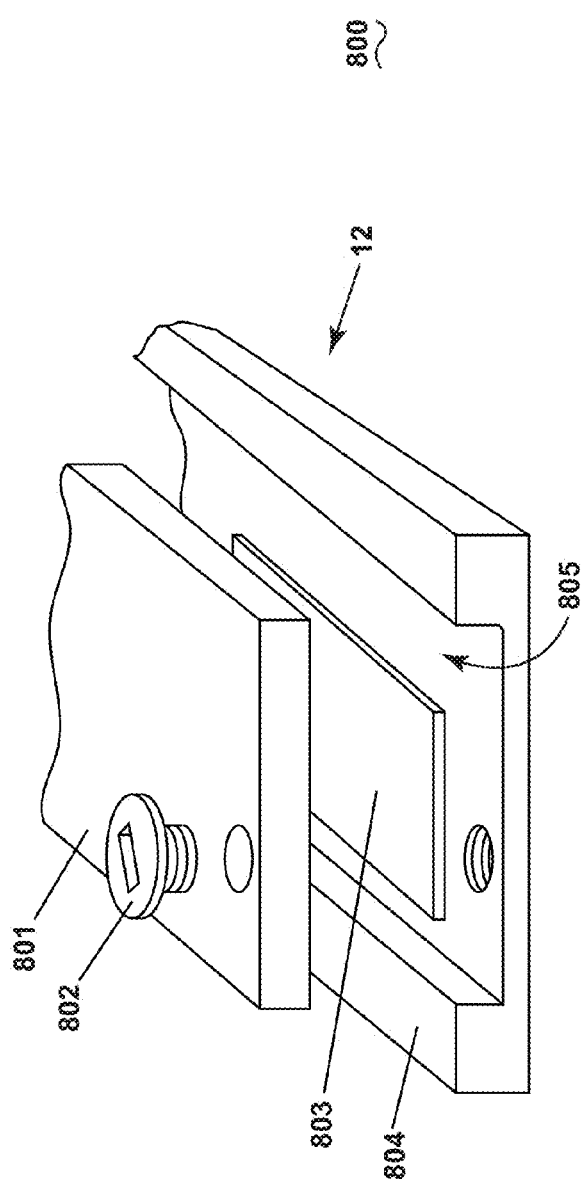
FIG. 8A is an exploded perspective view of a signal generator in accordance with various aspects described herein.
Figure 8B:
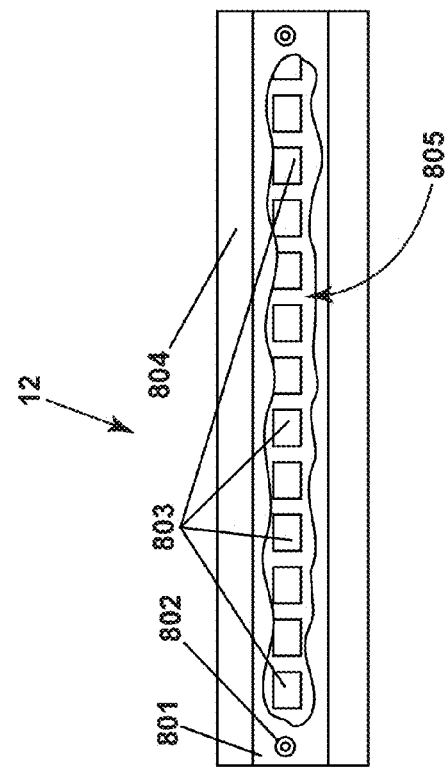
FIG. 8B is a schematic view of the signal generator of FIG. 8B, in accordance with various aspects described herein.

Yet another example of a non-limiting signal generator 12 is shown in FIGS. 8A and 8B in the form of a Paved Road Flush mounting Strip with Changeable Tags 800 (PRFSCT). The PRFSCT 800 can include a body having a first housing element 801, such as a top portion, and a second housing element 804, such as a base portion. At least one of the first or second housing elements 801, 804 can include a rigid non-inductive composite material. The second housing element 804 can include a recessed portion 805 running along a major body axis length that is configured, sized, or arranged to accept the first housing element 801. A set of RFID tags 803 can be received by or placed in the recess portion 805 and held or retained in place by fixing, placing, or coupling the first housing element 801 into the recessed portion 805 of the second housing element 804. The first and second housing elements 801, 804 can be physically coupled, attached, mounted together, or the like, by way of screws 802, adhesives, or another mechanical fastener. As with other example signal generators 12, the PRFSCT 800 can be flush mounted into grooves cut into a road surface, embedded into a road surface during application of paving material or concrete, or laid in a cut made into the existing road surface and then paved over. The PRFSCT 800 can also be installed in the environment such that the RFID tags 803 can be changed after installation by selectively providing access to the screws 802 or the first housing element 801.

FIGS. 9A and 9B illustrate another example of a non-limiting signal generator 12 shown in the form of a Paved Road Flexible Tag Strip 900 (PRFLEXTS). The PRFLEXTS 900 includes a main body 901 that can be formed from a flexible non-inductive composite material. The width or thickness of the PRFLEXTS 900 or the body 901 can be arranged, configured, selected, or the like, based upon its installation application, or applicable standards for the installation environment. The body 901 can include a set of RFID tags 902, for example, encapsulated along the length of the body 901. An adhesive 903, such as an adhesive qualified to meet the criteria of the Department of Transportation, can be applied to the bottom or underside of the body 901 to adhere it to surface, such as a road surface.

Figure 10:
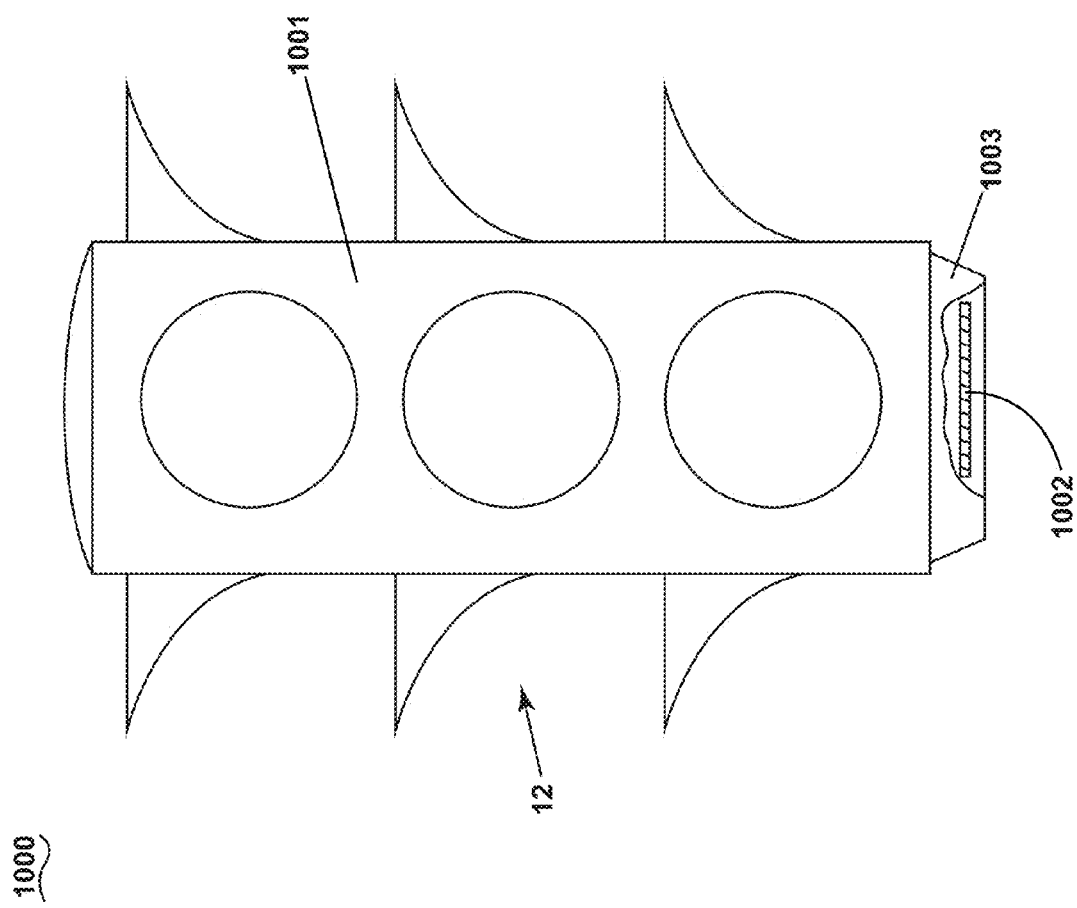
FIG. 10 is a perspective view of a signal generator in accordance with various aspects described herein.

Yet another example of a non-limiting signal generator 12 is shown in FIG. 10. FIG. 10 illustrates a signal generator 12 in the form of a Traffic Signal active RFID Holder 1000 (TLH). The TLH 1000 can include a traffic light housing 1001 and a signal generator body 1003 is attached, mounted, fixed, or the like, to the traffic light housing 1001, such as at bottom of a traffic light housing 1001. The signal generator body 1003 can be configured to hold, contain, or mount a set of RFID tags 1002.

FIG. 11A illustrates a non-limiting example detector 22, shown as a mountable detector 1100 that can be mounted under the vehicle. The streamline design can be retrofitted to the underside of a front bumper or spoiler. The detector 1100 can have four screw locations 1104 for attachment. FIG. 11B shows a back 1106 of the detector 1100, or antenna. It can be seen from this perspective that the back 1106 is removable for service of (UVA) antenna element components 1102, and that it has an adhesive seal 1105 to further secure it to the body as well as promote an attractive look. FIGS. 11A and 11B also show a connecting cable 1103 that can feed through the bumper and ultimately plug into a controller module, or RFID CPU.

FIGS. 12A and 12B illustrate another non-limiting example detector 22 in the form of a Side Mountable Vehicle RFID Antenna 1200 (SMA). The SMA 1200, or antenna is constructed so that it will conform to vehicle esthetics and aerodynamics. The antenna case itself consists of two halves, a front half 1201 and a removable back half 1205. FIG. 12A shows how the two halves 1201, 1205 encase an antenna element 1204. FIG. 12B shows an adhesive sealing strip 1203 used to adhere or fasten the SMA 1200 to the vehicle and a connecting cable 1202 which can feed through a fender and ultimately plug into the controller module, or RFID CPU. The shape of the SMA 1200 or casing halves 1201, 105 is not of any consequence as long as it can conceal and protect the antenna element 1204. Thus, the shape of the SMA 1200 or casing halves 1201, 105 is not limited to a specific shape illustrated, and other variations in shape could be implemented to conform to specific mounting needs. In original equipment manufacturer (OEM) applications the SMA 1200 can be integrated into the composite appointments of the vehicle such as bumpers and mirrors. Because more than one type of RFID tag location might be used, a set of two or more SMAs 1200 can be placed on the vehicle. Some applications can dictate locations on both sides, or the rear or the top of the vehicles.

Figure 13:
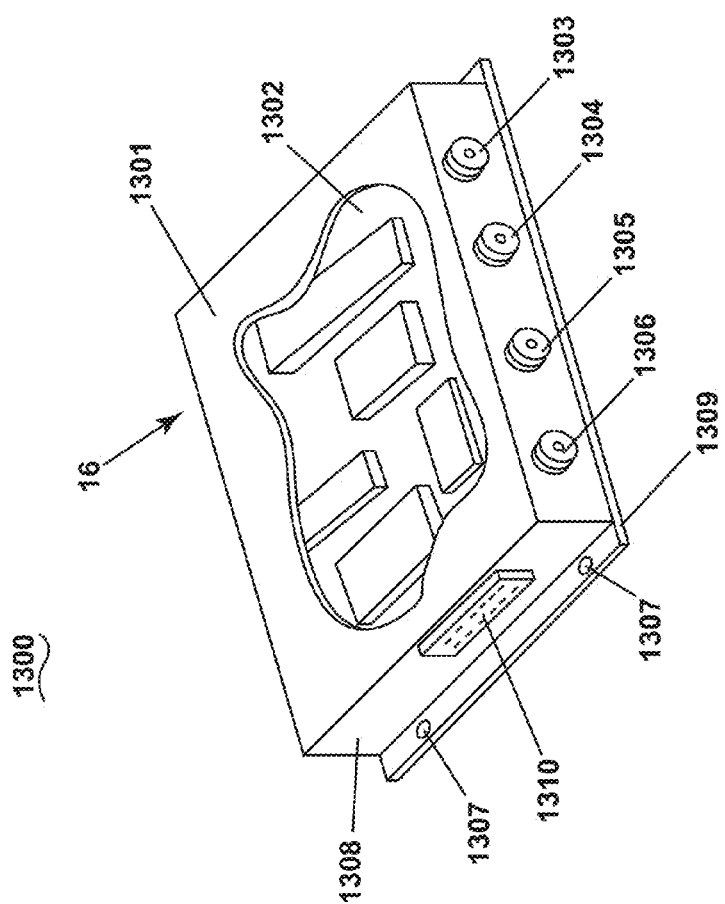
FIG. 13 is a top perspective view of a controller module in accordance with various aspects described herein.

One non-limiting example of the controller module 16 as seen in FIG. 13, illustrated in the form of a radio frequency identification (RFID) central processing unit (CPU) 1300. The CPU 1300, can include a case or housing having a bottom 1309 to which is mounted a component circuit board 1302. The circuit board 1302 can be protected by a water tight cover 1301 mounted with the bottom 1309 and held in place by four screws having four mounting holes 1307 to aid in surface mounting it either inside or outside of a vehicle cabin. The housing can be made of metal or another material that acts as a shield to RF frequencies so that the operation of this module does not interfere with other equipment or vehicles in the area. The CPU 1300 can include a number of inputs and outputs 1303-1306, 1310 configured to communicatively couple with at least one of the second set of sensors or the alert mechanism(s)

Figure 14:
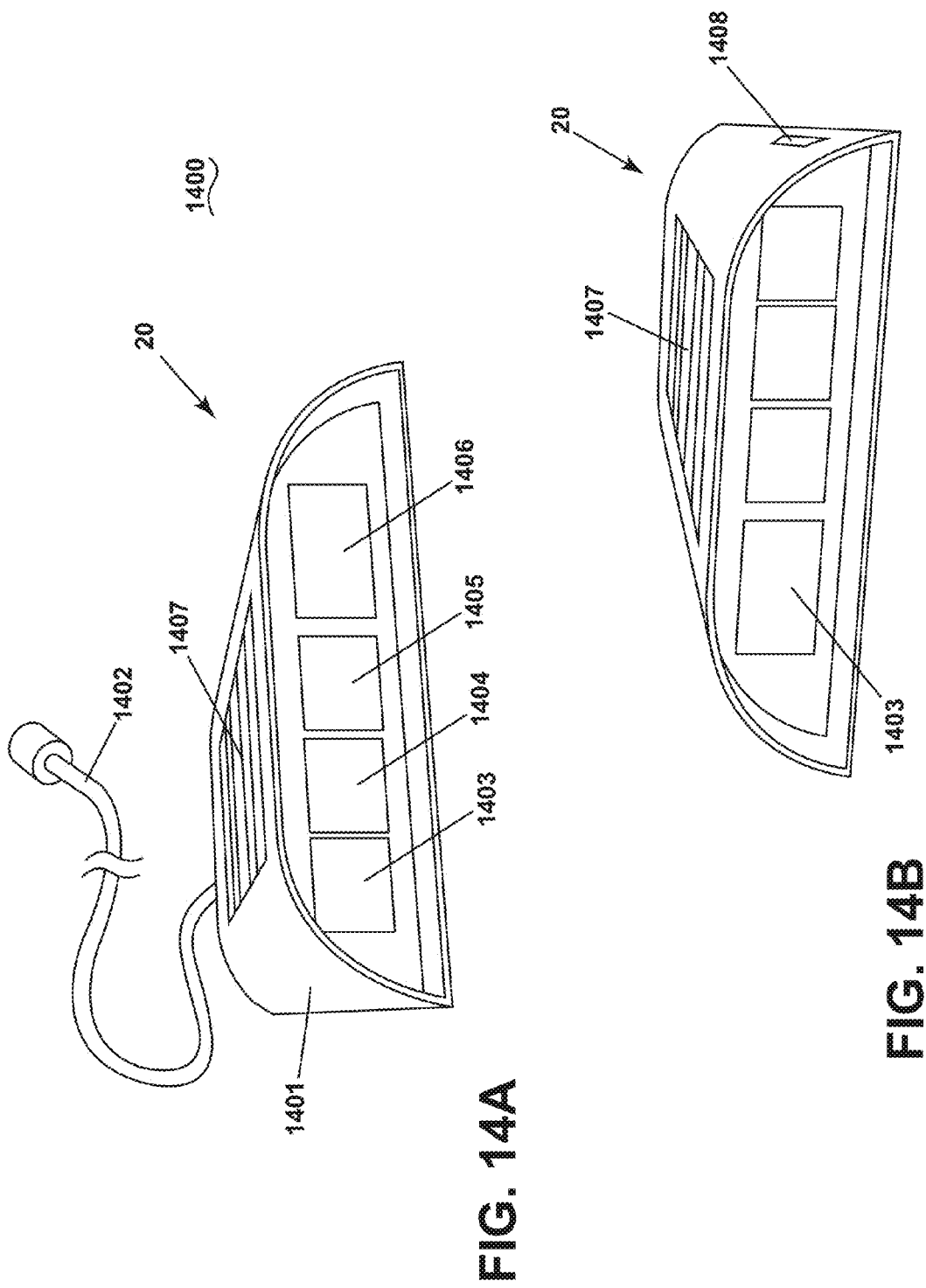
FIG. 14A is a perspective view of an apparatus for providing indication of status in accordance with various aspects described herein.
FIG. 14B is a perspective view of an apparatus for providing indication of status in accordance with various aspects described herein.

One non-limiting example of the alert mechanism 20 can be in the form of a Driver Alert Information Center (DAIC) 1400 as illustrated in FIG. 14A. A case or housing 1401 of the DAIC 1400 can be include plastic or any other suitable material construction. A surface of the DAIC 1400 facing the driver (front), can include several light indicators 1403-1406. These indicators light in accordance with the type of warning detected by the warning system. Each type of warning will light a different segment or different light indicator. In one non-limiting example configuration, the several light indicators 1403-1406 can include an LCD or an OLED screen. A speaker 1407 can also be included in DAIC 1400, for example, installed in the top of the DAIC 1400, to issue audible alert tones. The DAIC 1400 can receive its signals and power via a cable 1402 connected to a controller module. Different flashers and different audible tones can be displayed and provided depending on the type of impending traffic condition the warning system, or a predetermined traffic condition threshold, as described above. In one non-limiting example configuration, the DAIC 1400 can be arranged, configured, positioned, or the like, to be mounted on the dash board or in the instrument cluster of the vehicle, directly in front of the driver.

FIG. 14B illustrates another non-limiting example of the alert mechanism 20, similar to the DAIC 1400 of FIG. 14A, but wirelessly operable. In this example configuration, the wireless DAIC 1400 can be configured to operably receive a set of signal outputs wirelessly from the controller module. In one non-limiting example configuration, power for the wireless DAIC can be provided by a rechargeable battery contained within the unit and charged through a charging port 1408. Additional power configurations can be included.

Figure 15:
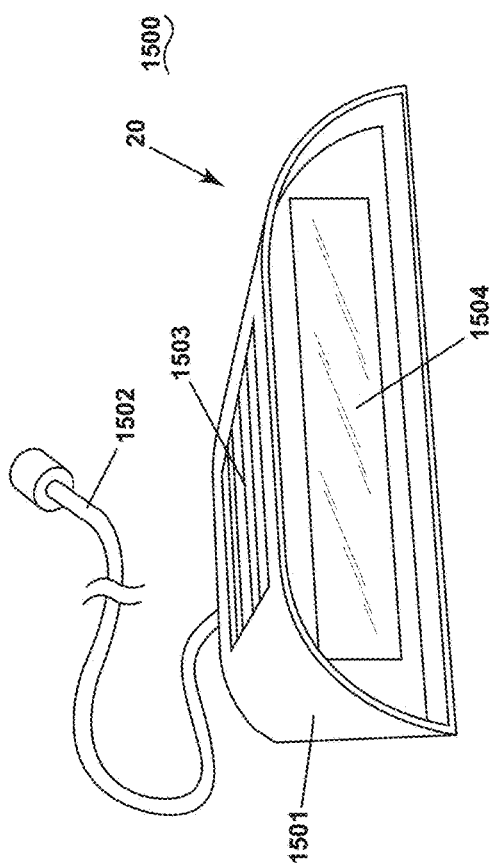
FIG. 15 is a perspective view of an apparatus for providing indication of status in accordance with various aspects described herein.
Figure 16:
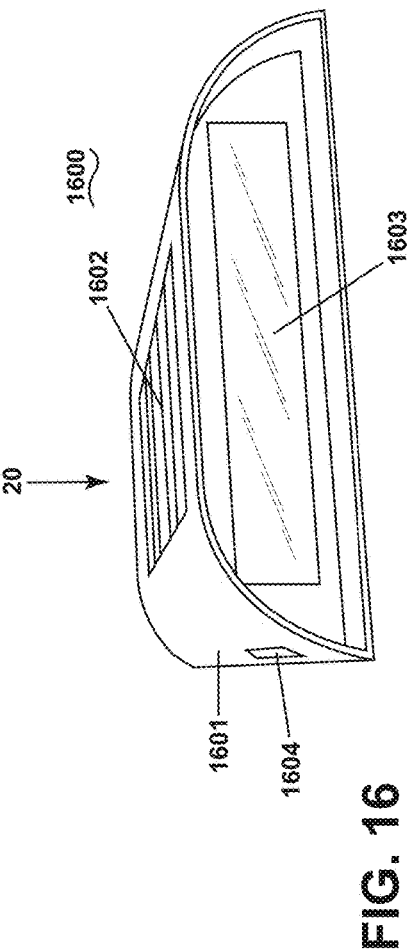
FIG. 16 is a perspective view of an apparatus for providing indication of status in accordance with various aspects described herein.

Another non-limiting example configuration of an alert mechanism 20 is shown in FIG. 15 in the form of a Driver Alert Information Center with Screen 1500 (DAICS). The DAICS 1500 can be similar to the DAIC of FIG. 14A or 14B, and can include a continuous a display screen 1504, as opposed to individual light indicators. FIG. 16 illustrates a non-limiting configuration of the alert mechanism 20 in the form of a Wireless Driver Alert Information Center with Screen 1600 (WDAIC). The WDAIC 1600 is similar to the DAICS of FIG. 15, but wireless. The WDAICS 1600 unit can receive signals wirelessly from the controller module, and power for the wireless DAIC can be provided by a rechargeable battery contained within the unit and charged through a charging port 1604. Additional power configurations can be included.

Figure 17:
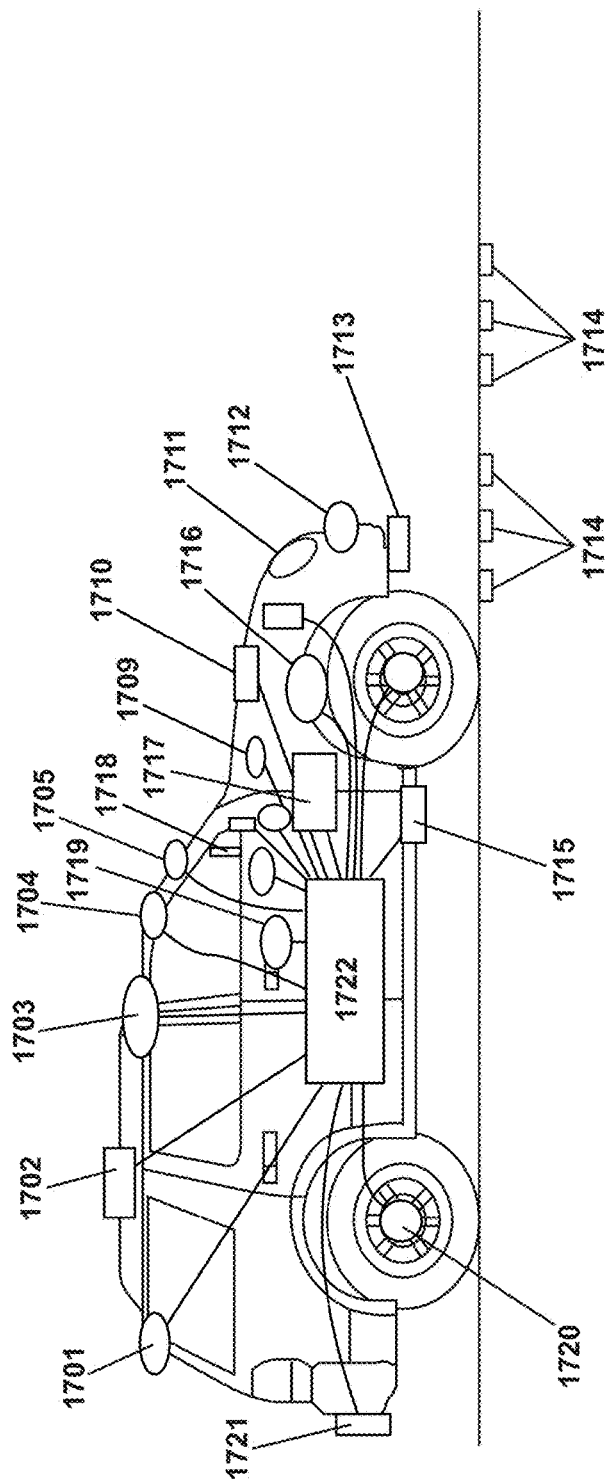
FIG. 17 is a schematic diagram of a vehicle in accordance with various aspects described herein.

FIG. 17 illustrates is an example schematic diagram of a vehicle, such as a car, including a second set of sensors, data supply modules, a controller module 1722 or RFID computer, as well as connections to the alert mechanism 1718. Here, vehicle sensors can include, but are not limited to, a G-Force sensor 1709, a vehicle pathway condition sensor 1715, the vehicle BCM 1717, a crash avoidance antenna/module 1712, a camera 1705, a GPS antenna/receiver 1704, a cellular mobile transceiver 1703, and a vehicle to vehicle (V2V) or vehicle to everything (V2X) module 1710. RFID signals can be received by RFID Antennas 1702, 1711, 1713, 1721 from signal generators in the environment 1714. The second set of sensors can also include brake lights 1701, the automatic braking systems 1720, tactile devices 1719, or an autonomous steering system 1716 for providing indications or enhanced modifications to the operating conditions of the vehicle, as described herein.

In a non-limiting example configuration, the EWD components located in and on the vehicle can be assembled in the following way. One of the RFID antennas can be mounted to the underside (UVA) of the vehicle below the front bumper, and another to the passenger side front fender (SMA) in a convenient location. Other antennas could be mounted anywhere on the vehicle such as the roof or rear bumper. The cables from the antennas can be routed to the RFID CPU and can be located in the engine compartment or vehicle cabin. The Driver Alert Information Center (DAIC) can be located on the dashboard, the instrument cluster directly in front of the driver, or anywhere else in plain view of the driver. The cable from this unit can be routed to the RFID CPU. Power for the EWD devices can be furnished by connecting the power supply wires of the RFID CPU to the vehicle's 12V ignition circuit permitting the units to be powered when the vehicle's ignition is turned on.

The RFID CPU unit can be connected to the Body Control Module (BCM) in order to obtain vehicle data such as vehicle speed, acceleration and deceleration, brake status, ABS system status, outdoor temperature. In addition a G-force sensor can be integrated into the system to monitor actual vehicle acceleration and deceleration. The G-force sensor could be integrated into the RFID reader housing or remotely mounted in the vehicle.

In addition the RFID CPU can provide output signals that feed the brake light circuit, activate the automatic breaking system, and vehicle to vehicle communication.

The signal generators or RFID tags outside the vehicle can be installed in the following way. In the case of a paved road, one or more Paved Road mounted RFID holders can be used PRF, PRS, BRTT, PRFS, PRFSCT, or PRFLEXTS in the center of the lane of traffic so the under vehicle RFID antenna (UVA) can be utilized. In the case of roads that will not support this type of installation such as gravel roads, a Roadside Mounted RFID tag Holder (RMH) can be used. This type of RFID tag holder could be mounted to a metal pole driven into the ground or any other fixed surface at the side of the road. In the case that a RMH is used, a Side Mountable Vehicle RFID Antenna (SMA) can be used to "read" the tag. Other locations for the mounting of RFID tag antennas might be overhead on highway overpasses. A roof mounted antenna can then be utilized.

Figure 18:
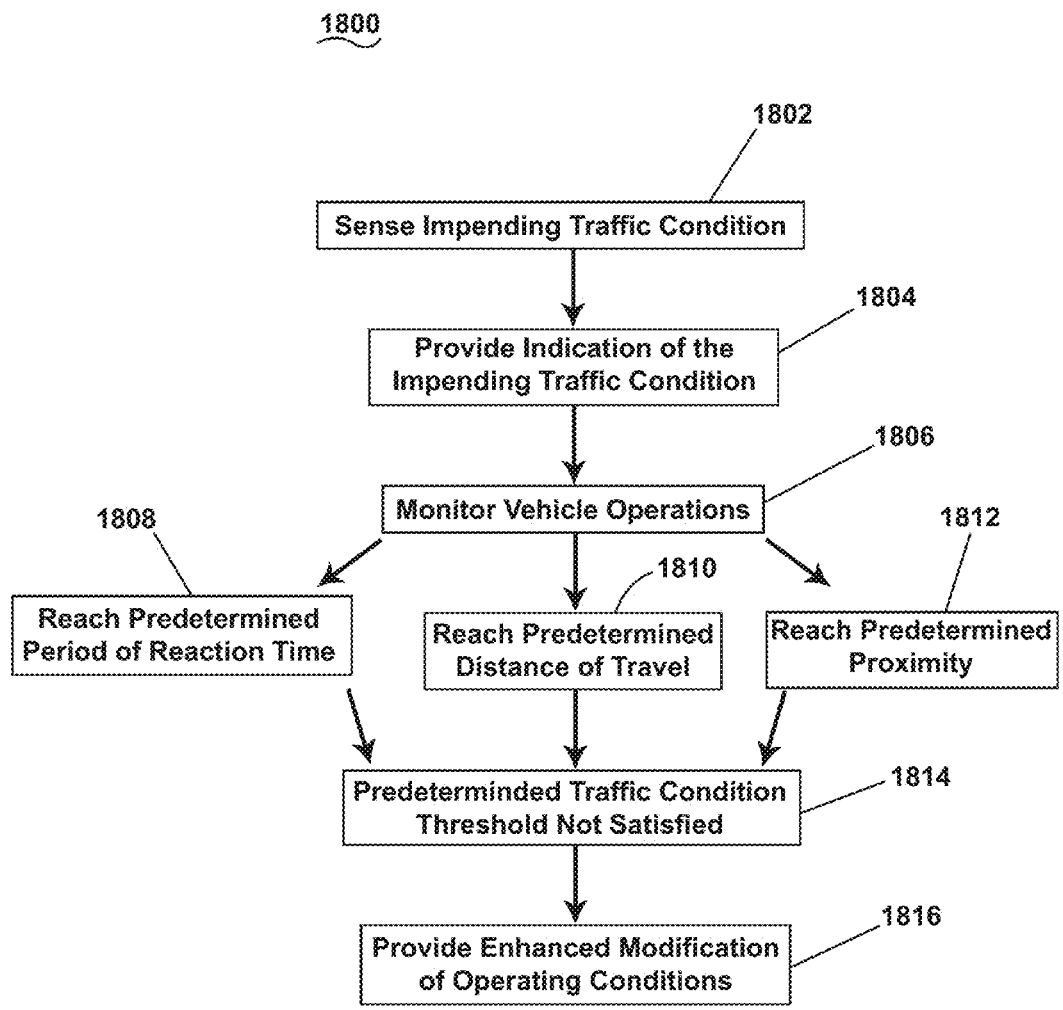
FIG. 18 is a flow chart illustrating a method of operation in accordance with various aspects described herein.

A method of operation is illustrated in FIG. 18. The method 1800 begins at step 1802 by sensing an impending traffic condition. Upon sensing an impending traffic condition, a first indication of the impending traffic condition is provided at step 1804. The operating conditions of the vehicle are then monitored at step 1806 for changes in the operating conditions, and at step 1814 a determination is made as to whether any monitored changes in the operating conditions of the vehicle satisfy a predetermined traffic condition threshold for traversal of the impending traffic condition. The monitored changes can include reaching a predetermined period of time at step 1808, reaching a predetermined distance of travel at step 1810, or reaching a predetermined proximity at step 1812. If changes in the operating conditions do not satisfy a predetermined traffic condition threshold at step 1814, an enhanced modification of the operating conditions of the vehicle is provided at step 1816.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

In another non-limiting example operation, the controller module generates interrogating Radio Frequency (RF) signals which are transmitted by an RFID antenna. This interrogating RF signal when brought into the proximity of an RFID tag, energizes the RFID tag, and then sends back its preprogrammed code. The code is then received by the RFID receiving antenna and sent to the RFID CPU (RFCPU). The RFID CPU then interprets the signal along with additional data sent to it by, for example, the vehicle BCM. The RFID CPU then activates the Driver Alert Information Center (DAIC), alerting the driver of the approaching stop sign, if necessary, as described herein.

Many other possible embodiments and configurations in addition to that shown in the above figures are contemplated by the present disclosure. For example, one non-limiting configuration of the disclosure can include traffic lights comprising "active" RFID signatures which alert drivers of red or yellow light conditions. Aforementioned alert methods can be utilized in the same way that passive RFID signatures are recognized. In another non-limiting configuration of the disclosure, the system can improve accuracy of compass and GPS data by comparing vehicle direction, and GPS location, respectively and RFID signatures could help to alert drivers of traffic alerts. In another non-limiting configuration of the system, emergency vehicle alerts such as police, fire, ambulance or volunteer vehicles can emit active RFID signatures that are receivable by the warning system while responding to emergencies to alert nearby drivers. In yet another non-limiting aspect of the disclosure, vehicles involved in traffic accidents, for example, as sensed by the warning system, can emit an active RFID signature to alert nearby drivers to use caution or call for assistance, such as when a collision occurs or when an airbag has been deployed.

Yet another non-limiting aspect of the disclosure can include integrating the warning system with an audio system of a vehicle. An audio system can mute upon active alert, and/or the audio system itself shall be used as an alert device or mechanism. In yet another non-limiting aspect of the disclosure, the warning system can be configured to alert or warn an occupant of a vehicle of school zones, construction zones, posted speeds, school busses, pedestrian crossings, or the like. For example, during a school day, an active RFID signal can be in tandem with the yellow flashing light and can alert drivers to reduce speed and drive cautiously. In another example, for construction zones, RFID tags can be placed on barrels, road surface, signs, or overhead. RFID tags can notify drivers of a speed limit on the road they are traveling. Posted speed data can be further combined with vehicle speed data to alert the driver that they are speeding. In another example regarding school busses, the warning system can be configured to emit an active RFID signal when school bus lights are flashing red to alert nearby drivers.

It is also within the scope of the disclosure to assist an occupant of a vehicle with parking. An RFID tag can be placed in parking spots to aid drivers in the precise location to park the vehicle. Accurate GPS coordinates can be provided in locations where GPS data is not available, such as parking garages or tunnels, by RFID tags. It is also contemplated that the warning system can provide traffic lane information, wherein RFID signals notify the driver of lane uses such as exit, merge, lane ending, carpool, or express lanes, etc., or toll booth information, or wherein RFID signal can alert drivers of upcoming toll booths and rates. RFID tags can also be placed in or on lane designation lines and road edges, and can warn drivers that they are drifting into another lane, crossing the center line, or leaving the roadway. Another non-limiting example of an enhanced modification of the operating conditions of the vehicle can include flashing vehicle lights or engaging a horn if the vehicle fails to stop at a red light or stop sign.

Self-driving vehicles (Smart Car Technology) Data from RFID tags of the warning system can further be used to improve accuracy of, or guide self-driving vehicles along a roadway. Data can be related to road and traffic instructions and or restrictions for autonomous vehicles operation. If a roadway is not suitable for one or more autonomous driving functions because of construction, public, or personal safety reasons, the warning system can warn the driver of the vehicle and automatically disengage the one or all autonomous driving functions. RFID tags can further be placed in or alongside the road way that can alert truck drivers to the presence of a weigh station, and whether it is open or closed. It is also contemplated that RFID tags located in or along the roadside can provide and address number to a vehicle as it passes by.

Yet another non-limiting example of an impending traffic condition can include indication of travel in a wrong direction wherein RFID tags can be arranged in a particular order along the roadway in order alert drivers of the wrong direction of travel. Yet another non-limiting example of an impending traffic condition can include an overpass wherein an RFID tag can notify drivers of approaching clearance heights, and railways such that the warning system can be configured to notify the conductor of speed, track identification, crossings, and coordinates to improve safety. Likewise, RFID tags can notify drivers of an elevated draw bridge status, or a rail road crossing including an indication of an active crossing.

Additional non-limiting examples of the alert mechanism can include a "driver alert information center" such as a multi-line display such as LCD or OLED screens, a heads up display, or smart phone interaction. Notifications and alerts for the warning system can be integrated and displayed within the vehicles "info center" in OEM applications.

While the primary description of aspects of the disclosure have been directed to a car, embodiments of the disclosure can be included in air or water-based applications as well. For instance, in other embodiments of the warning system, airplanes on the ground can use RFID tags placed in or around the runways to identify runways and boarding gates and can be warned before entering runways in use. In marine applications, RFID tags can be mounted on a buoy or light house in order to alert boaters when passing buoys and breakwater entrances, which is of particular importance in heavy fog and at night.

There are several advantages of one or more aspects of the present disclosure. For example, the set of signal generators of the warning system is independent of external power requirements. Rural stop sign intersections do not have to be powered by utility lines. The warning system can operate regardless of visibility, since the warning system does not have to rely on visually recognizing the traffic signs. Weather, glare of the sun and headlights, and blockage of the sign does not affect its operation. The RFID signaling can be custom tailored to the intersection conditions.

Another advantage is that the infrastructure components are low cost to municipalities. Furthermore, the warning system can be easily retrofitted to vehicles and roadway infrastructure and is easily standardized and upgradeable. Additional RFID codes can be added easily. The Radio Frequency Identification Central Processing (RFCPU) can be "updated" with a download from a portable storage device or wirelessly. Additionally, the warning system does not rely on other utility systems to operate. The warning system can be lane specific. The information supplied by the RFIDs can be interpreted only by the individual vehicles passing over it. Additionally, the system is able to be integrated with the emerging automotive technologies such as "Automatic Emergency Braking" (AEB), Adaptive Speed control, Crash avoidance systems, GPS, and autonomous operation vehicles.

Additionally, the present innovation is more reliable than conventional system reliant on other sensing systems such as visibility, which can be limited by fog, dust or snow, some electronic systems, which can be limited by radio interference or cloud cover for GPS reception. Additionally, conventional systems can be reliant on external power supply, which can be limited in situations power supply needs or if the power grid failure. Also, in the event that there are obstacles in the road or damaged signage, and the warning system doesn't rely on third party connections that can cause a system to be undependable.

The EWD warning system also includes another advantage over other conventional systems in that it not only alerts drivers that they are approaching an impending traffic condition, but the two stage process and use of an computer continues to monitor the vehicle and issue a second alert or enhanced modification if necessary. The warning system is further capable of integrating with autonomous vehicle systems to direct them and disconnect them when the vehicle is in an area where driverless vehicles are a danger to pedestrians and property.

To the extent not already described, the different features and structures of the various embodiments of the disclosure may be used in combination with each other as desired. For example, one or more of the features illustrated and/or described with respect to one of the embodiments can be used with or combined with one or more features illustrated and/or described with respect to the other of the embodiments. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the disclosure has been specifically described in connection with certain specific embodiments thereof, it is to be understood that this is by way of illustration and not of limitation. Reasonable variation and modification are possible within the scope of the forgoing disclosure and drawings without departing from the spirit of the disclosure which is defined in the appended claims.

What is claimed is:

1. A method of warning an occupant of a vehicle of a traffic condition comprising the steps of:

sensing, by a set of non-visual sensors on the vehicle, an impending traffic condition, the set of non-visual sensors mounted on the exterior of the vehicle in at least two of the following vehicle location: under the vehicle directed to sense downward, in a first sideward-facing direction to sense outwardly from the first sideward-facing direction, on a second sideward-facing direction opposite from the first sideward-facing direction, on a rearward-facing direction of the vehicle directed to sense rearwardly, and a forward-facing direction of the vehicle directed to sense forwardly;

wherein the non-visual sensors are configured to sense an impending traffic condition by receiving a signal from one or more signal generators located external to and within a near proximity to the vehicle, and wherein the information contained in the signal received from the one or more signal generators related to an impending traffic condition is preset information;

providing, by a controller module of the vehicle, a first indication of the impending traffic condition;

monitoring, by the controller module, the operating conditions of the vehicle after the first indication for changes in the operating conditions;

determining, by the controller module, whether any monitored changes in the operating conditions of the vehicle satisfy a predetermined traffic condition threshold for traversal of the impending traffic condition; and providing, by the controller module, an enhanced modification of the operating conditions of the vehicle to the extent that any monitored changes in the operating conditions of the vehicle do not satisfy the predetermined traffic condition threshold within one of a predetermined period of reaction time, a predetermined distance of travel, or predetermined proximity of the impending traffic condition;

wherein the enhanced modification includes at least one of applying an automatic braking system, operating an autonomous control system of the vehicle, or limiting the operation of the vehicle.

2. The method of claim 1 wherein sensing includes sensing by way of a set of non-visual sensors mounted on the vehicle, wherein the set of sensors are arranged for sensing from different perspectives.

3. The method of claim 1, further comprising providing the sensed traffic condition to a controller module.

4. The method of claim 1 wherein providing the first indication includes providing at least one of a visual alert, an audible alert, or a vibratory alert.

5. The method of claim 1 wherein monitoring the operating conditions includes monitoring at least one of a vehicle speed, a vehicle acceleration, a vehicle deceleration, gravitational forces experienced by the vehicle, a global positioning satellite location of the vehicle, a vehicle braking status, a vehicle pathway condition, radar sensors, a temperature sensor, the current time of day, or a driver preference setting.

6. The method of claim 5 wherein sensing includes sensing the predetermined traffic condition threshold for the impending traffic condition, and wherein providing includes providing the predetermined traffic condition threshold for the impending traffic condition.

7. The method of claim 5, further comprising determining the predetermined traffic condition threshold based on sensing an impeding traffic condition identifier.

8. The method of claim 1 wherein providing the enhanced modification provides a second indication of the impending traffic condition, wherein the second indication is an increased indication, compared with the first indication.

9. The method of claim 8 further comprising a determining whether any further monitored changes in the operating conditions of the vehicle occurring after providing a second indication of the impending traffic condition satisfy the predetermined traffic condition threshold.

10. The method of claim 9 further including applying an automatic braking system for the vehicle to the extent that any further monitored changes in the operating conditions of the vehicle occurring after providing the second indication do not satisfy the predetermined traffic condition threshold within one of a predetermined period of reaction time, a predetermined distance of travel, or predetermined proximity of the impending traffic condition.

11. The method of claim 1 wherein providing the enhanced modification includes applying the automatic braking system.

12. The method of claim 1 wherein providing the enhanced modification is configured to change the operating conditions of the vehicle to safely react to the impending traffic condition.

13. The method of claim 1, wherein at least one signal generator is located in the road traveled on by the vehicle or mounted to a traffic light or traffic sign positioned along the road traveled on by the vehicle.

14. The method of claim 1, wherein the preset information includes a distance to a regulatory traffic sign, a location of road lines, or a change in traffic regulations.

15. Apparatus for a vehicle, comprising:
a set of signal generators provided in an environmental installation external to the vehicle and configured to generate a first set of outputs related to an impending traffic condition, wherein the information contained in the first set of outputs related to an impending traffic condition is preset information;

a first set of at least two non-visual sensors mounted on the exterior of the vehicle and configured to receive a signal from one or more signal generators, the at least two non-visual sensors mounted on the vehicle in at least two of the following vehicle location: under the vehicle directed to sense downward, in a first sideward-facing direction to sense outwardly from the first sideward-facing direction, on a second sideward-facing direction opposite from the first sideward-facing direction, on a rearward-facing direction of the vehicle directed to sense rearwardly, and a forward-facing direction of the vehicle directed to sense forwardly, and configured to generate a second set of outputs related to the operating conditions of the vehicle;

a second set of vehicle sensors provided on the vehicle and configured to generate a third set of outputs related to the data generated during operating conditions of the vehicle;

an alert mechanism configured to provide a first alert and a second alert, wherein the second alert is greater than the first alert; and a controller module configured to receive the first set of outputs, the second set of outputs, and the third set of outputs, and configured to provide the first alert by way of the alert mechanism when the first set of outputs is received, and further configured to provide the second alert by way of the alert mechanism when the second and third set of outputs do not satisfy a predetermined traffic condition threshold within one of a predetermined period of reaction time, a predetermined distance of travel, or predetermined proximity of the impending traffic condition wherein the second alert includes at least one of applying an automatic braking system, operating an autonomous control system of the vehicle, or limiting the operation of the vehicle.

16. The apparatus of claim 15 wherein the set of signal generators include at least one of a traffic light signal generator, an embedded vehicle pathway signal generator, a sign-mountable signal generator.

17. The apparatus of claim 16 wherein the set of signal generators include indicia related to the generated set of outputs related to the impending traffic condition.

18. The apparatus of claim 16 wherein the set of signal generators are configured to generate a first set of outputs indicative of at least one of the type of impending traffic condition, the location of the traffic condition, a distance relative to the traffic condition, or the predetermined traffic condition threshold.

19. The apparatus of claim 15 wherein the second set of vehicle sensors include at least one of a vehicle speed sensor, a vehicle acceleration sensor, a vehicle deceleration sensor, gravitational sensor, a global positioning satellite location sensor, a vehicle braking sensor, a radar sensors, a temperature sensor, a clock, or a driver preference sensor.

20. The apparatus of claim 15, wherein the first set of at least two non-visual sensors are arranged to receive the first set of outputs.

21. The apparatus of claim 15 wherein the controller module is configured to operably change the operating conditions of the vehicle to safely react to the impending traffic condition.

22. The apparatus of claim 15, wherein at least one of the set of signal generators is located in the road traveled on by the vehicle or mounted to a traffic light or traffic sign positioned along the road traveled on by the vehicle.

23. The apparatus of claim 15, wherein the preset information includes a distance to a regulatory traffic sign, a location of road lines, or a change in traffic regulations.

* * * * *